United States Patent
Lassota

(10) Patent No.: US 9,668,496 B1
(45) Date of Patent: Jun. 6, 2017

(54) METHOD OF BREWING A BEVERAGE WITH AN ELECTRIC, AUTOMATIC BEVERAGE MAKER

(75) Inventor: Zbiniew G. Lassota, Long Grove, IL (US)

(73) Assignee: Food Equipment Technoloigies Company, Inc., Lake Zurich, IL (US)

( * ) Notice: Subject to any disclaimer, the term of this patent is extended or adjusted under 35 U.S.C. 154(b) by 1472 days.

(21) Appl. No.: 12/470,040

(22) Filed: May 21, 2009

Related U.S. Application Data

(60) Provisional application No. 61/055,797, filed on May 23, 2008.

(51) Int. Cl.
 A23F 5/26 (2006.01)
 A23F 5/18 (2006.01)
 A47J 31/18 (2006.01)

(52) U.S. Cl.
 CPC .................. *A23F 5/18* (2013.01); *A47J 31/18* (2013.01)

(58) Field of Classification Search
 CPC .................................... A23F 5/26; A47J 31/18
 USPC ....... 426/231, 432, 594; 99/284, 295, 289 R, 99/287
 See application file for complete search history.

(56) References Cited

U.S. PATENT DOCUMENTS

| | | | |
|---|---|---|---|
| 650,129 A | 5/1900 | Lewis | |
| 751,709 A | 2/1904 | Adams | |
| 987,096 A | 3/1911 | Hansen | |
| 2,401,529 A | 6/1946 | Varney et al. | |
| 2,547,067 A | 4/1951 | Waline | |
| 4,990,734 A * | 2/1991 | Hirsch | 219/689 |
| 5,351,604 A * | 10/1994 | King et al. | 99/289 R |
| 5,478,592 A | 12/1995 | Kingsley et al. | 426/594 |
| 5,619,904 A * | 4/1997 | Di Nunzio et al. | 99/295 |
| D382,764 S | 8/1997 | Brady | D7/317 |
| 5,809,867 A | 9/1998 | Turner et al. | 99/297 |
| D405,641 S | 2/1999 | Brady | D7/319 |
| 5,992,300 A | 11/1999 | Fukushima | 99/302 |
| 6,079,316 A | 6/2000 | Barden et al. | 99/297 |
| 6,085,637 A | 7/2000 | Fukushima | 99/279 |
| 6,240,833 B1 | 6/2001 | Sham et al. | 99/297 |
| 6,272,974 B1 | 8/2001 | Pascotti | 99/318 |
| 6,279,461 B1 | 8/2001 | Fukushima et al. | 99/299 |
| 6,295,920 B1 | 10/2001 | Barden et al. | 99/297 |
| 6,422,133 B1 | 7/2002 | Brady | 99/297 |
| 6,425,317 B1 | 7/2002 | Simmons | 99/299 |
| D493,662 S | 8/2004 | Bodum | D7/319 |
| 6,797,304 B2 | 9/2004 | McGonagle | 426/431 |
| 7,032,505 B2 | 4/2006 | Brady | 99/297 |
| 7,032,507 B2 | 4/2006 | Cai | 99/323 |
| 7,213,507 B2 | 5/2007 | Glucksman et al. | 99/297 |
| D557,978 S | 12/2007 | Bodum | D7/399 |
| 7,318,371 B2 | 1/2008 | Chan | 99/281 |
| D566,454 S | 4/2008 | Bodum | 72/297 |
| 7,469,627 B2 | 12/2008 | Li | 99/286 |
| 7,472,641 B2 | 1/2009 | Majer | 99/284 |
| 7,487,713 B2 | 2/2009 | Magno | 99/302 |
| 2003/0047081 A1 | 3/2003 | McGonagle | 99/279 |
| 2003/0079612 A1 | 5/2003 | Con | 99/275 |
| 2003/0185949 A1 | 10/2003 | Brady | 426/433 |
| 2004/0020368 A1 | 2/2004 | Cai | 99/279 |
| 2005/0103200 A1 | 5/2005 | Huik | 99/279 |
| 2005/0139091 A1 | 6/2005 | Haverstock | 99/495 |
| 2005/0199129 A1 | 9/2005 | Glucksman et al. | 99/279 |
| 2005/0238338 A1 | 10/2005 | Chan | 392/324 |
| 2005/0284303 A1 | 12/2005 | Zell et al. | 99/279 |
| 2006/0011066 A1 | 1/2006 | Bunn et al. | 99/279 |
| 2006/0090653 A1 | 5/2006 | McDuffe et al. | 99/279 |
| 2006/0174773 A1 | 8/2006 | Taylor | |
| 2007/0068393 A1 | 3/2007 | Nosler et al. | 99/279 |
| 2007/0137494 A1 | 6/2007 | Wilhite | 99/279 |
| 2007/0137495 A1 | 6/2007 | Talbert | 99/286 |
| 2007/0221069 A1 | 9/2007 | Rahn et al. | 99/323 |
| 2008/0072766 A1 | 3/2008 | Kobylarz | 99/279 |
| 2009/0293733 A1 * | 12/2009 | Martin et al. | 99/280 |

FOREIGN PATENT DOCUMENTS

DE 713707 11/1941

\* cited by examiner

*Primary Examiner* — Vera Stulii
(74) *Attorney, Agent, or Firm* — James W. Potthast; Potthast & Associates

(57) ABSTRACT

A method of brewing a beverage, such as freshly brewed coffee, in an electrical, automatic beverage brewer (10) with a rotatable mixing chamber (12) for mixing water (109) from a hot water tank (28) with dry beverage ingredient (108) having a closed top (7) and an open bottom (3, 66) to which is releasably mounted a brew basket (14) with an open top (19) for fluid communication with the mixing chamber (12) through the open bottom (3, 66). Before mounting, the brew basket (14) is loaded with a filter (105) and dry beverage ingredient (109). The mixing chamber (12) with the brew basket (14) attached is then automatically turned upside down (FIG. 6) to dump the dry beverage ingredient (109) out of the filter (105) and onto the closed top (7) of the rotatable mixing chamber (12). A preselected amount of water (109) is then infused into the mixing chamber (12) to a level beneath the open bottom (3) and filter (105) and onto the dry beverage ingredient (109) for mixing therewith. After a preselected mixing time period is passed the mixing chamber (12) and mounted brew basket (14) is automatically turned right side up to pass the beverage (110) through the filter (105) and out of the drain hole (90) of the brew basket (14). After the mixing chamber (12) has been returned to an upright position, pressurized air (44, 46, and 48) is automatically injected into the mixing chamber (12) to hasten the passage of beverage (110) through the filter (105) and out of the drain hole (90).

36 Claims, 10 Drawing Sheets

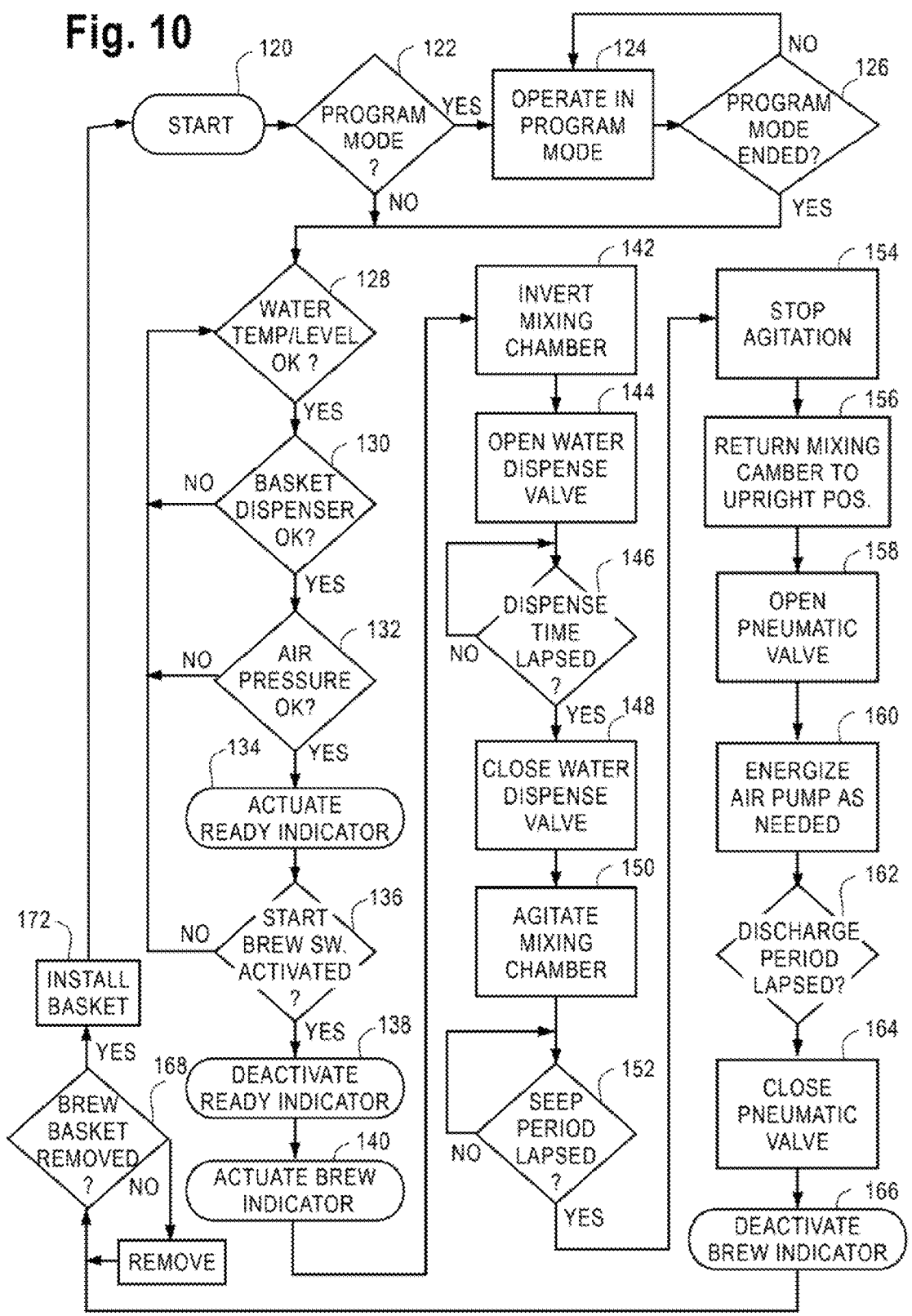

METHOD OF BREWING A BEVERAGE WITH AN ELECTRIC, AUTOMATIC BEVERAGE MAKER

CROSS REFERENCE TO RELATED APPLICATION

This application claims the benefit under 35 U.S.C. 119(e) of provisional patent application Ser. No. 61/055,797 filed May 23, 2008, which is hereby incorporated by reference.

BACKGROUND OF THE INVENTION

Field of the Invention

This invention generally relates to an electrical, automatic coffee maker and, more particularly, to a commercial electrical coffee maker capable of making large quantities of freshly brewed coffee in a single batch and passing the coffee directly to an insulated dispenser especially adapted to fit with the brewer for direct receipt of the coffee from the brewer.

Discussion of the Prior Art

There are many ways to make freshly brewed coffee. There are infusion coffee makers for making espresso coffee; there are drip-type coffee makers; there are percolator-type coffee makers; there are French press coffee makers and other types of coffee makers. It is widely believed by those skilled in the art of fresh coffee brewing that the French press coffee makers are the ones most capable of producing the best, most flavorable and aromatic coffee. This is believed true because with a French press coffee maker it is possible to accurately control the process to obtain uniform extraction of the essential oils and other components of the ground coffee into the hot water with which it is mixed.

In a French press coffee maker, fresh dry coffee grounds are placed in a container and then all the hot water that will be used to make the desired quantity of coffee is quickly added to the grounds to quickly mix with all the coffee grounds. The mixture is allowed to seep for a preselected, relatively short period of time with statically or while stirring. Then the remaining solids are quickly removed from the liquid to obtain uniform extraction associated with a high quality brew. At the end of the mixing, or seeping, time period a piston is quickly plunged into the container to rapidly separate the liquid coffee beverage from the solid materials of the remaining coffee grounds to quickly stop further extraction. In this way it is possible to avoid both under-extraction and over-extraction, both of which are associated with less than optimum quality.

In other coffee makers, such as a drip type coffee maker, in which hot water is deposited onto the top of a layer of coffee grounds contained in a porous filter, the level of extraction is a combination of over-extraction which occurs at the beginning of the brew cycle when the hot water is first added to the dry coffee grounds followed by under extraction which occurs towards the end of the brew cycle after the best of the essence of the already wet coffee grounds has already been extracted.

Traditionally, French press coffee makers have only been manually operated with the plunging action being performed manually and at a time that is determined by the operator of the French press coffee maker. Should the operator become impatient, and activate the plunger too soon, then the coffee can be undesirably under-extracted. On the other hand, if the operator is distracted, and operates the plunger after the time period for optimum uniform abstraction has passed, then the coffee may be over-extracted. Making optimum operation even more difficult, the optimum time period for extraction will vary with the amount of coffee grounds that are placed in the container and with the amount of water that is added to the container into which the coffee is extracted, dissolved or mixed. In such case, the operator may not know the correct timing and thereby fail to make the proper adjustment to the extraction time to obtain optimum extraction.

Consequently, even though the French press coffee maker is capable of providing coffee that is optimally extracted for best quality without waste of coffee grounds that are not extracted or coffee grounds that are over-extracted, in actual practice, due to the manual nature of the operation, such optimal extraction is not always obtained.

Another problem with traditional French press coffee makers is that because they are manually operated and require the operator to manually remove the freshly made scolding hot coffee from the container, for safety reasons, the French press coffee makers have been substantially limited to making only one or, at most, two cups of coffee at a time. Thus, the French press technique of making coffee has not had application in commercial coffee makers in which greater quantities of coffee, such one half gallon to five gallons, are made during a single brew cycle.

SUMMARY OF THE INVENTION

It is therefore an object of the present invention to provide a method of brewing a beverage, such as coffee, in an automatic, electric beverage maker that enables brewing coffee with uniform extraction and having the same quality as coffee made with a French press coffee maker but which overcomes the disadvantages of non-automatic operation and of limited batch size.

This objective is partly achieved by providing a method of brewing a beverage in an electrical automatic beverage brewer by performing the steps of mixing water with a dry beverage ingredient to make beverage in a rotatable mixing chamber assembly having a rotatable mixing chamber with a closed top and an open bottom; installing a filter into a brew basket with an open top and a bottom with a drain hole; inserting a preselected amount of beverage ingredient into the brew basket and supported on the filter; mounting the brew basket to the mixing chamber with the open top of the brew basket pressed against the open bottom of the mixing chamber; rotating the mixing chamber to an upside down position with the closed bottom beneath the open top and brew basket to dump the ingredient out of the filter and brew basket onto the closed top of the mixing chamber; injecting a preselected quantity of water into the mixing chamber sufficient to make at least several individual servings of beverage to create a mixture of water and ingredient; after lapse of a preselected seeping time period, rotating the mixing chamber to an upright position with the closed top above the open bottom to pour the mixture onto the filter; and passing the beverage through the filter and out of the drain hole into a beverage dispenser capable of holding at least several individual servings of beverage.

Preferably, the step of injecting water into the mixing chamber includes the step of injecting water into the mixing chamber to a level beneath the open top of the mixing chamber, and the steps of rotating the mixing chamber to an upside down position, injecting water into the mixing chamber, rotating the mixing chamber to an upright position and injecting pressurized air into the mixing chamber are all performed automatically according to a preselected timing sequence in response to operation of a controller.

The method also preferably includes the step of injecting pressurized gas into the mixing chamber after the step of rotating the mixing chamber to an upright position to hasten the passage of beverage through the filter and out of the drain hole. The step of injecting pressurized gas into the mixing chamber includes the steps of pressurizing a gas compressor tank to a preselected pressure by operating an electric air pump, and actuating a solenoid controlled gas valve connected between the gas compressor tank and the mixing chamber for a preselected amount of time.

In the preferred embodiment, the step of mounting includes the step of releasably mounting the brew basket to the mixing chamber while pressing the filter between a filter connection surface adjacent the open bottom of the mixing chamber and a filter connector surface adjacent the open top of the filter basket when the filter basket is releasably mounted to the mixing chamber. The brew basket has a double-walled construction with a solid, water impervious, outer wall and an inner wall that is at least partly water pervious and separated from the inner wall by a gap, and the method includes the step of passing beverage that has been passed through the filter through the inner wall of the brew basket and down along an interior surface of the outer wall in which the drain hole is formed. The step of inserting beverage ingredient in to the basket is performed when the brew basket is detached and spaced from the mixing chamber, and the step of mounting the brew basket includes the step of releasably attaching the brew basket to the mixing chamber with releasable mating connectors carried by the mixing chamber and the brew basket.

The object of the invention is also achieved, in part, by provision of a method of brewing beverage in an electrical automatic beverage brewer, by performance of the steps of mixing water with a dry beverage ingredient inside a rotary mixing chamber mounted for rotation between an upright position and an upside down position when the chamber is in the upside down position for a preselected seeping time period automatically determined by an electronic controller; after lapse of the preselected seeping time period, automatically rotating the mixing chamber to the upright position; after the mixing chamber has been rotated to the upright position automatically positively pressurizing the mixing chamber to force beverage formed from the mixture downwardly out of the mixing chamber, and through a filter and into a beverage container.

Preferably, the mixing chamber has a closed top and an open bottom, and the step of mixing includes the step of automatically injecting a preselected quantity of water into the mixing chamber in an amount in excess of at least several individual servings of beverage to a level that is beneath the open bottom of the mixing chamber when the closed top of the mixing chamber is beneath the open top. The mixing chamber has a permanently closed top and an open bottom, and the method includes the steps of inserting a preselected amount of beverage ingredient into a brew basket, and after the step of inserting and before the step of mixing, releasably mounting the brew basket to the open bottom, and rotating the mixing chamber to the upside down position after the brew basket has been releasably mounted to the open bottom and the beverage ingredient has been inserted. A filter is installed into the brew basket, an upper open end of the filter is automatically releasably secured to the brew basket when the brew basket is releasably mounted to the open bottom of the mixing chamber, and the filter is automatically released from attachment to the filter basket when the brew basket is detached from the open bottom of the mixing chamber.

In the preferred embodiment the brew basket has a double walled construction with an inner water pervious wall and an outer water impervious wall, and the step of installing the filter includes the steps of supporting the filter on the inner water pervious wall of the brew basket when the beverage is forced through the filter. The beverage is passed through the inner water pervious wall after being forced through the filter. The beverage then passes downwardly along the outer wall to a drain hole formed in the outer wall after the beverage is forced through the filter and before being passed into the container. The step of mixing includes the step of injecting water into the mixing chamber when the mixing chamber is in the upside down position.

Also, the object of the invention is achieved in part by providing a method of brewing a beverage with an electrical, automatic, beverage brewer, comprising the steps of mounting a brew basket with a filter and dry beverage ingredient and a drain hole to a mixing chamber for fluid communication with the mixing chamber through an open bottom of the mixing chamber; automatically turning the brew basket upside down to dump the dry beverage ingredient out of the filter and onto a closed top of the rotatable mixing chamber; automatically infusing a preselected quantity of water into the rotatable mixing chamber to a level beneath the open top and onto the dry beverage ingredient after the mixing chamber has been turned upside down; mixing the preselected quantity of water with the dry beverage ingredient within the mixing chamber for a preselected seeping period of time; automatically turning the mixing chamber and mounted brew basket right side up after lapse of the preselected seeping time period; and pressuring the beverage through the filter and out of the drain hole of the brew basket at least partly with the force of gravity while filtering out undesolved elements of the beverage ingredient.

The method preferably includes the step of automatically injecting pressurized air into the mixing chamber after the mixing chamber has been turned right side up to assist the force of gravity pressuring the beverage through the filter. This pressurizing step includes the steps of pressurizing an air compressor tank with an air pump, and selectively passing pressurized air from the air compressor tank to the mixing chamber through an electronically controlled pneumatic valve.

BRIEF DESCRIPTION OF THE DRAWINGS

Obtainment of the objects of the invention will be made apparent from the preferred embodiment of the rotatable beverage brewer of the present invention described in detail below with reference to the several figures of the drawing, in which:

FIG. 10 is a logic flow chart of the operations software employed in the controller of FIG. 1 for operating the pressurized rotatable brewer of the present invention.

DETAILED DESCRIPTION

Figure 1:
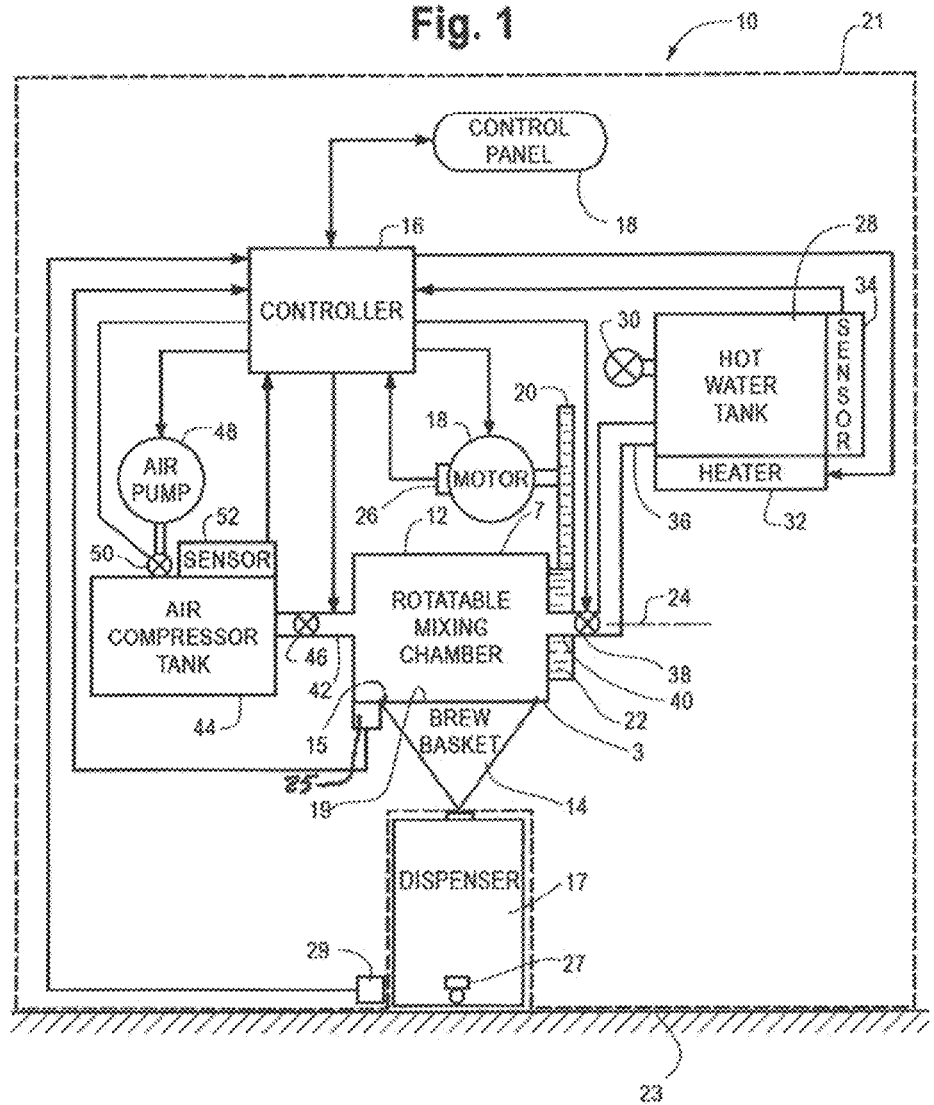
FIG. 1 is a functional block diagram of a preferred embodiment of the rotatable beverage brewer of the present invention.

Referring to FIG. 1, the best use of the beverage maker 10 is for making freshly brewed coffee from ground coffee beans. Accordingly, although the beverage maker 10 may be employed to make other freshly brewed beverages, such as tea, cocoa, etc., for purposes of brevity and succinctness the description of the beverage maker 10 that follows will assume that the beverage being made is coffee.

The rotatable beverage maker 10 of the present invention has a rotatable mixing chamber 12 with an open bottom 3 and a top 7. The open bottom 3 has a bottom filter opening 15 to which the top 19 of a filter holding, conical, brew basket 14 is releasably attached to cover, or close, the bottom filter opening 15.

Before commencement of a brew cycle, the brew basket 14 is detached from the rotatable mixing chamber 12 and loaded with a quantity of ground coffee appropriate for the batch size, or multi-serving amount, of freshly brewed beverage being made. Generally, more or less quantities of ground coffee grounds are added for greater or lesser quantities of brewed coffee to be made. Before loading of the conical brew basket 14, a filter 105, FIGS. 2 and 5, conforming to the conical shape of the brew basket 14 is placed into, and supported by, the conical brew basket 14. The filter 105 may be a disposable, porous, conical, coffee filter paper, a reusable mesh filter made of gold or the like, or both a paper filter and a permanent filter combined. For purposes of simplicity, even if the filter 105 is composed of both a paper and a permanent filter, it will be referred to herein in the singular as the filter 105. The ground coffee 108, FIG. 5, in turn, is supported by the filter 105. While a conical shape for the filter 105 is preferred, it should be appreciated that other shapes, such as frustoconical or cylindrical, may be successfully employed.

Figure 5:
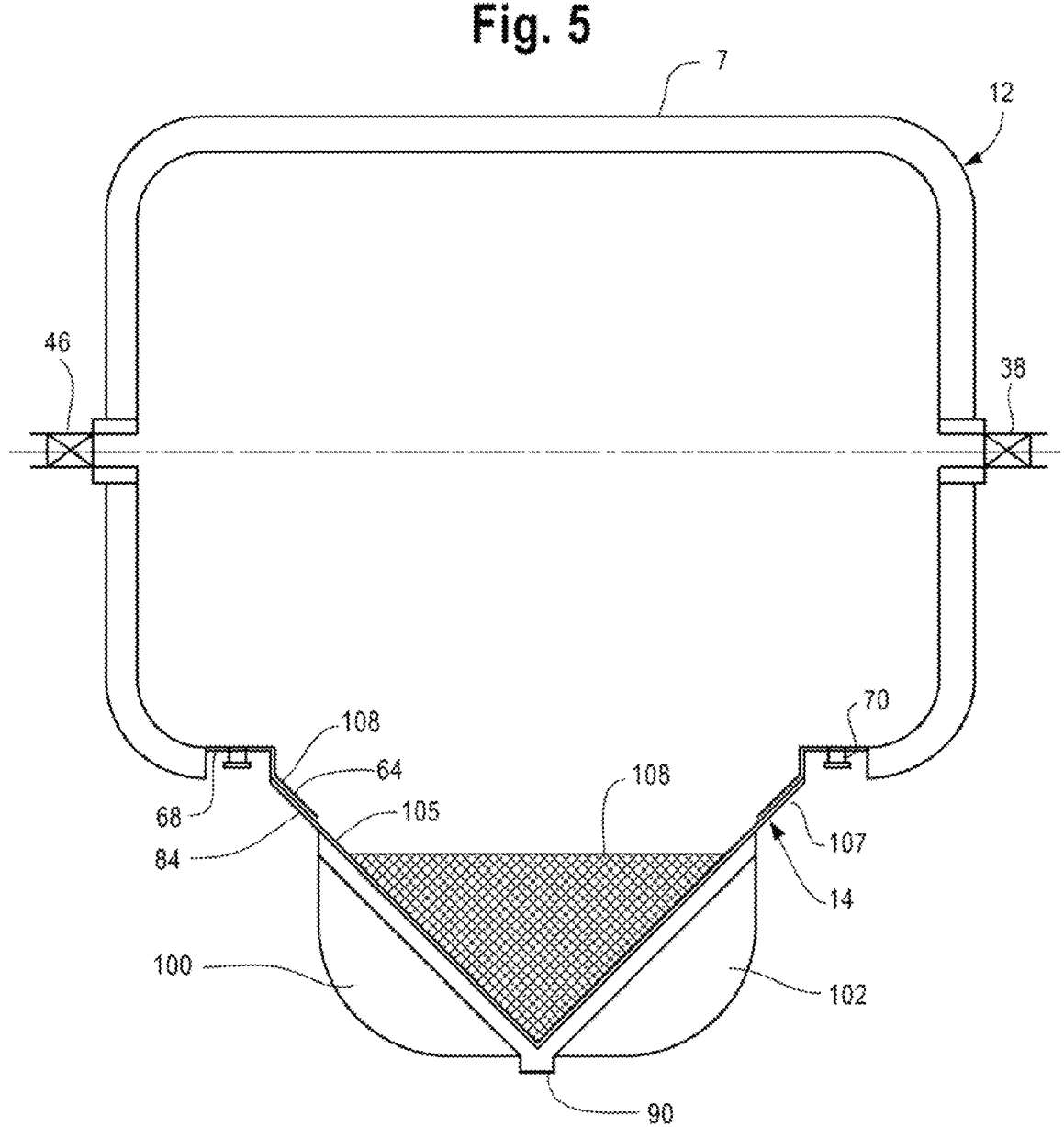
FIG. 5 is a side sectional view of the rotatable mixing chamber, brew basket and filter element of FIG. 1 in assembled relationship together with a load of dry, ground coffee beans supported on top of the filter.

After the ground coffee 108 has been loaded on top of the filter 105, the brew basket 14 is reattached to the rotatable mixing chamber 12, as shown in FIG. 5. The peripheral edge 107 of the filter 105 is resiliently clamped, or squeezed, between a peripheral end wall 84 of the conical brew basket 14 and a truncated conical, filter connection collar 64 surrounding a bottom opening 66 of the rotatable mixing chamber 12. Accordingly, when the rotatable mixing chamber 12 is rotated, the filter 105 is held in place against the interior surface of the conical brew basket 14, as shown in FIG. 5.

Again referring to FIG. 1, an insulated dispenser 17 is especially adapted to closely fit with the brewer 10 for direct receipt of coffee from the brew basket 14 into and through an inlet at the top of the dispenser 17, with minimum exposure to air. Individual, generally cup-sized, servings of freshly brewed beverage are served from the dispenser via a manually operated faucet 27. The faucet 27 is located at the bottom 3 of the dispenser 17 in the case of a regular dispenser and is located adjacent the closed top 7 in the case of an airpot dispenser. When located directly beneath the brew basket 14 in correct receiving position, the dispenser 17 is sensed by a dispenser sensor 29. The dispenser sensor may be magnetic sensor, a photo-sensor, a micro-switch or any other suitable sensor. The dispenser 17 is portable, and after completion of a brew cycle may be removed to a serving location remote from the brewer 10. The details of the dispenser 17 and its spatial relationship with the brewer 10 that enables direct brewing into the dispenser with minimum exposure to air and resultant heat loss do not form a part of this invention, and reference should be made to one or more of U.S. Pat. No. 6,708,598, "Beverage Dispenser with Cover Assembly and Method"; U.S. Pat. No. 6,884,452 "Air Pot Beverage Dispenser with Flow Through Lid and Display and Method", U.S. Pat. No. 6,884,452 "Method of Serving Freshly Brewed Beverage From a Dispenser"; and U.S. Pat. No. 6,135,009 "Brewing System with Dispenser Urn Loading Apparatus and Method", all of which are hereby incorporated by reference.

All the components of the brewer 10 are contained within, or mounted to, a shared housing 21 that is supportable on a counter top 23 or the like. When the brew basket 14 is properly fastened to the rotatable mixing chamber 12, a magnetic, micro-switch or photo optical brew basket sensor 25 indicates this presence to a computer-based controller 16. If the dispenser sensor 19 also indicates that the dispenser 17 is in place, and other conditions are satisfied, such as minimum water temperature and level in the hot water tank 28, as described below with reference to FIG. 10, then under control of the computer based controller 16 and in response to manual actuation of a start brew switch (not shown) of a control panel 18, the rotatable mixing chamber is rotated 180-degrees.

Figure 6:
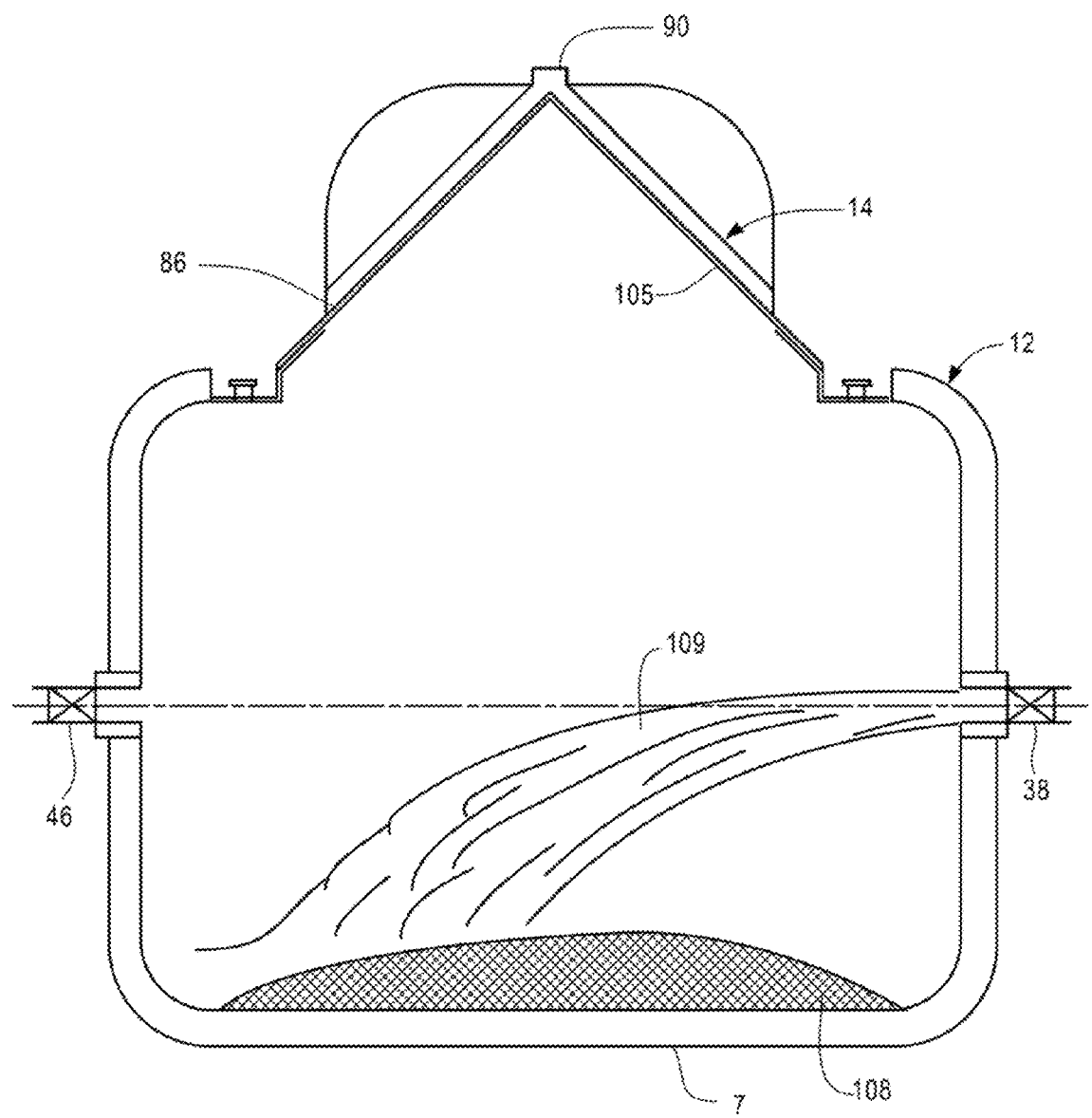
FIG. 6 is a sectional side view of the rotatable mixing chamber, brew basket and filter element of FIG. 5 after the rotatable mixing chamber has been rotated 180-degrees to dump the coffee previously contained within the filter onto the interior surface of the closed top of the rotatable mixing chamber and after a valve has been opened to dispense water into the rotatable mixing chamber at a relatively high rate at the beginning of a water dispense period of the brew cycle.

This is achieved by the controller 16 actuating an electrical rotary motor 18 that has a rotary drive gear 20 attached to a rotor of the electric motor 18. The drive gear 20 is linked to a driven gear 22 that is fixedly attached to the rotatable mixing chamber 12. The driven gear is centered about an axis of rotation 25 passing through the rotatable mixing chamber 12. A sensor 26 associated with the motor 18 indicates to the controller when 180-degrees of rotation has been completed at which time the controller deactuates the motor 18. When the motor is deactuated, the rotatable mixing chamber 12 is upside down with the brew basket 14 and attached filter located above the rotatable mixing chamber 12, as shown in FIG. 6.

As seen in FIG. 1, a hot water tank 28 is connected with an external source of water, such as from a public water utility, through a solenoid controlled, inlet fill valve 30 that is controlled by the controller 16. The hot water tank 28 contains a supply of hot water that is heated to a preselected hot temperature between approximately 195-degrees and 205-degrees Fahrenheit by an electrical hot water heater 32 controlled by the controller 16. Other sensors 34 associated with the hot water tank 28 sense the temperature of the water in the tank 28 and the level of the water in the tank 28 and provide corresponding information to the controller 16 to enable it to control the inlet fill valve 30 and the electrical hot water heater 32. The controller 16 selectively opens the inlet fill valve 30 to maintain the water in the hot water tank 28 at a preselected level. An outlet 36 of the hot water tank 28 is connected to the rotatable mixing chamber 12 through a solenoid controlled dispense valve 38 and a water inlet, or inlet water connector, 40 that is aligned with the axis of rotation 25. Alternatively, hot water is supplied via an on demand hot water system in which a preselected amount of metered cold water from a utility source is instantly heated to the desired temperature as it is supplied to the mixing chamber 12, as shown in U.S. patent application Ser. No. 12/248,194, filed Oct. 9, 2008, and entitled "Multi-Beverage Brewer with On-Demand Variable Brew Water Temperature and Method", which is hereby incorporated by reference.

A pressurized air inlet, or pneumatic connector, 42 is located on another side of the rotatable mixing chamber 12 opposite from the water inlet 40 which is also aligned with the axis of rotation 25. The pressurized air inlet 42 is connected to an air compressor tank 44 through a solenoid controlled pneumatic valve 46. The air pressure in the compressor tank 44 is determined by the controller 16 selectively energizing an electrical air pump 48. The electrical air pump 48 is connected to the air compressor tank 44 through a solenoid controlled pneumatic valve 50. When the pneumatic valve 50 is opened, the electrical air pump 48 is actuated to pump pressurized air into the compressor tank 44 through the pressurized air inlet 42. The solenoid controlled pneumatic valve 50 and the air pump 48 are controlled by the controller 16 in response to signals from a pressure sensor 52 that senses the level of the air pressure within the air compressor tank 44. When the sensed pressure drops beneath a preselected minimum level, the air pump 48 is actuated and the solenoid controlled pneumatic valve 50 is opened to increase the pressure to a preselected maximum pressure. When the sensed maximum pressure is reached, the pneumatic valve 50 is closed and the air pump is deactuated. The pressure in the air compressor tank 44 is thereby maintained between the preselected maximum and minimum pressure levels. While these maximum and minimum pressures are preferred, it should be appreciated that other pressure levels may be successfully employed. The greater the pressure injected into the mixing chamber, the faster the beverage will be discharged from the chamber and thus the optimum pressure must be optimized through experimentation to obtain the best level of extraction.

After the rotatable mixing chamber 12 has been turned upside down, the controller 16 causes the solenoid controlled, water dispense valve 38 to open for a preselected time to pass a preselected quantity of hot water into the rotatable mixing chamber 12. The preselected quantity maybe a relatively small amount but is never more than the amount that would cause the level of hot water in the rotatable mixing chamber 12 to rise above the open bottom 3 and the top 19 of the brew basket 14 and the filter 105.

When the rotatable mixing chamber 12 is first turned upside down, all of the ground coffee that was supported by and contained within the filter 105 and conical brew basket 14 falls out of the filter 105 and is dumped onto the closed top 7 of the inverted, rotatable mixing chamber 12, as best seen in FIG. 6. When the water 109, FIG. 6, enters into the rotatable mixing chamber 14, it falls on top of and percolates into the dry ground coffee 108, FIG. 6 to mix with the ground coffee to brew the coffee beverage.

Figure 7:
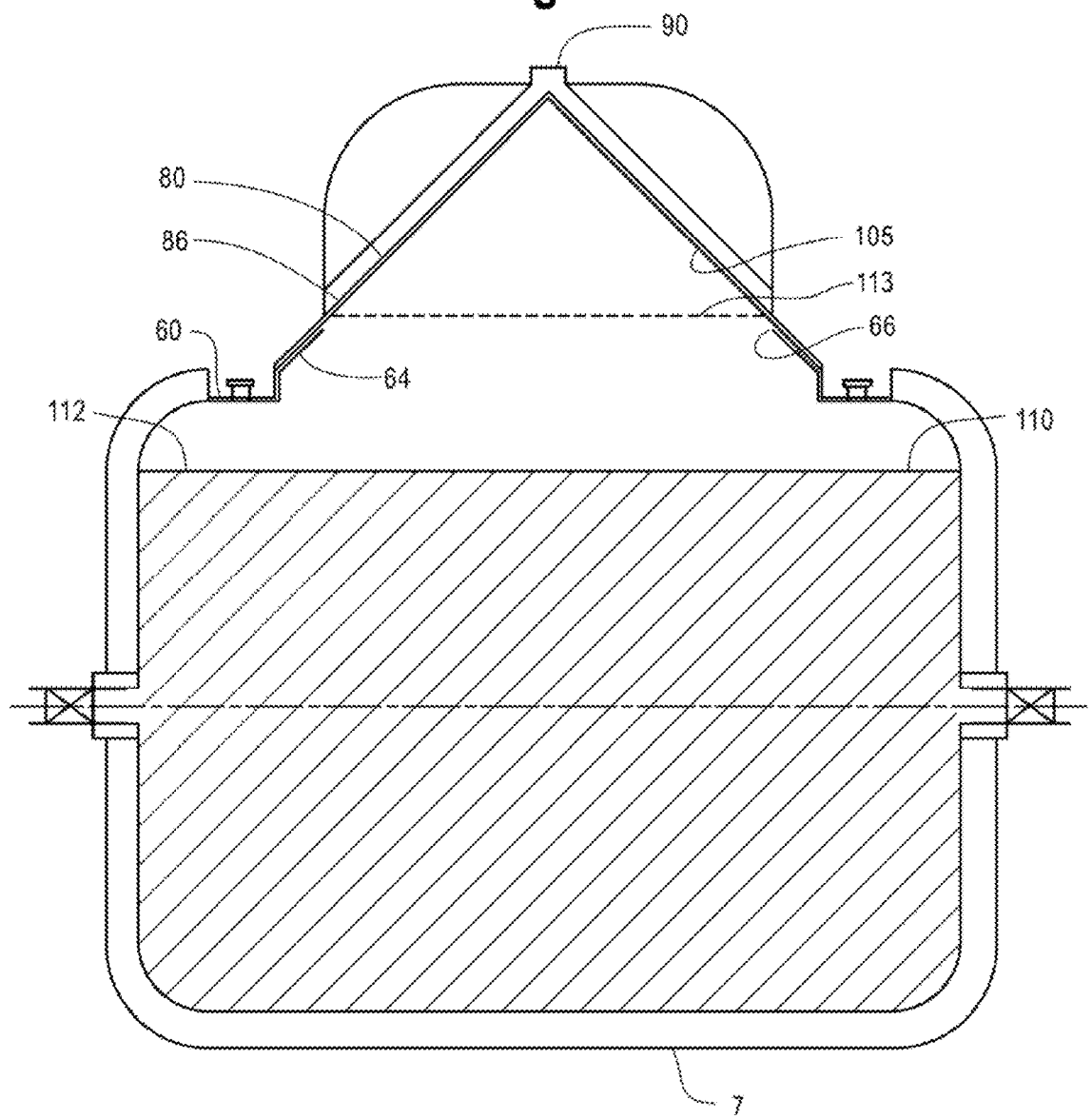
FIG. 7 is a side sectional view of the rotatable mixing chamber of FIGS. 1 and 2 after the rotatable mixing chamber has been rotated 180-degrees and the full amount of hot water has been added to the rotatable mixing chamber and is uniformly extracting the coffee flavor components during a preselected seeping period of the brew cycle.

The uniform extraction into the hot water of the flavor elements, compounds and oils from the ground coffee then begins. The total desired amount of hot water is promptly added to, or infused into, the rotatable mixing chamber 12, as shown in FIG. 7, The extraction is permitted to continue for a preselected, optimum, seeping time, mixing time, or extraction time. The optimum time is empirically determined based on the quantity, quality and type of coffee grounds, the quantity of water and the temperature of the water. During the preselected mixing time, the motor 18 may be intermittently, temporarily actuated to slightly jog, or shake, the rotatable mixing chamber 12, preferably back and forth, to shake and agitate the water and coffee mixture to accelerate the mixing and extraction process. Again, the exact amount of such agitation must be determined empirically.

After the preselected optimum extraction time has passed, the rotatable mixing chamber 12 is quickly rotated back 180-degrees from the upside down position to its original upright position, as shown in FIG. 7, and the pneumatic valve 46 is opened by the controller 16 to pressurize the interior air space of the rotatable mixing chamber 12 located above the top level of the mixture of the coffee grounds and the hot water with the freshly brewed coffee, i.e. the hot water with the uniformly extracted coffee components. This added pressure rapidly and forcibly discharges the freshly brewed coffee out though the filter 105 and out of a drain hole 90, FIG. 2. at the bottom of the conical brew basket 14. Generally, multiple serving-sized batches of the freshly brewed coffee is drained into the mating insulated dispenser 17 that is especially adapted to fit with the brewer to limit heat loss. However, the brewer is capable of making an individual sized serving and the coffee is drained directly into an individual serving container, such as a cup, if only a single serving quantity is being made. The rapid, forcible discharge of the coffee quickly terminates the extraction process and thereby prevents both over extraction. Under extraction is prevented by the quick mixture of the entire quantity of water with the coffee grounds The details of the brewer elements of the brewer 10 of FIG. 1 including the hot water tank 28, the heater 32, the sensors 34, the inlet valve 30, the dispense valve 38, the controller 16, and the control panel 18 and other form no part of the present invention, except, and to the extent, they have been modified to perform the functions specified herein. Reference may be made to U.S. Pat. No. 5,000,082 issued to Lassota on Mar. 19, 1991 for "Beverage Maker and Method of Making Beverage"; U.S. Pat. No. 5,331,885 issued to Lassota on Jul. 26, 1994 for "Semiautomatic Beverage Maker and Method"; U.S. Pat. No. 5,943,944 issued to Lassota on Aug. 31, 1999, for "Brewing System with Hot Water Urn Flushing Apparatus"; U.S. Pat. No. 5,953,981 issued to Lassota on Sep. 21, 1999; and patents cited therein, which are hereby incorporated by reference, and the other patents cited herein for further information concerning such details.

Likewise, the details of the beverage dispenser 17 form no part of the invention. If further information concerning the details of a beverage dispenser that may be used with the present invention, reference should be made to one or more of U.S. Pat. No. 6,705,208 issued Mar. 16, 2004; U.S. Pat. No. 6,606,937 issued Aug. 19, 2003; U.S. Pat. No. 6,619,507 issued Sep. 26, 2004 and U.S. Pat. No. 6,702,253 issued Mar. 9, 2004; U.S. Pat. No. 6,708,598 issued Mar. 23, 2004, all issued to Zbigniew G. Lassota, all of which are hereby incorporated by reference, as well as the other patents cited herein.

Figure 2:
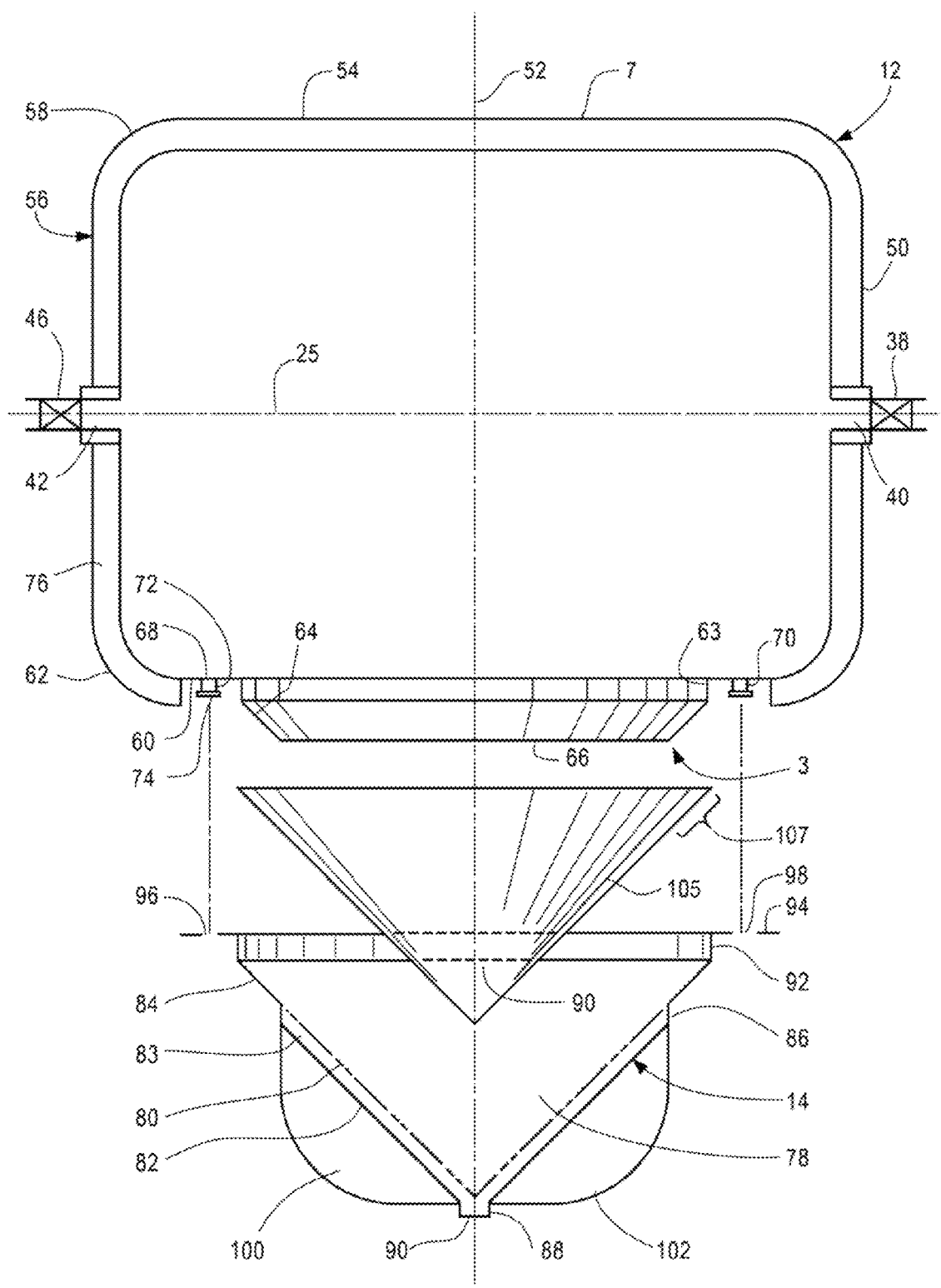
FIG. 2 is an exploded sectional side view of an embodiment of the rotatable mixing chamber functional block of FIG. 1 together with the associated brew basket and filter element, or filter.
Figure 3:
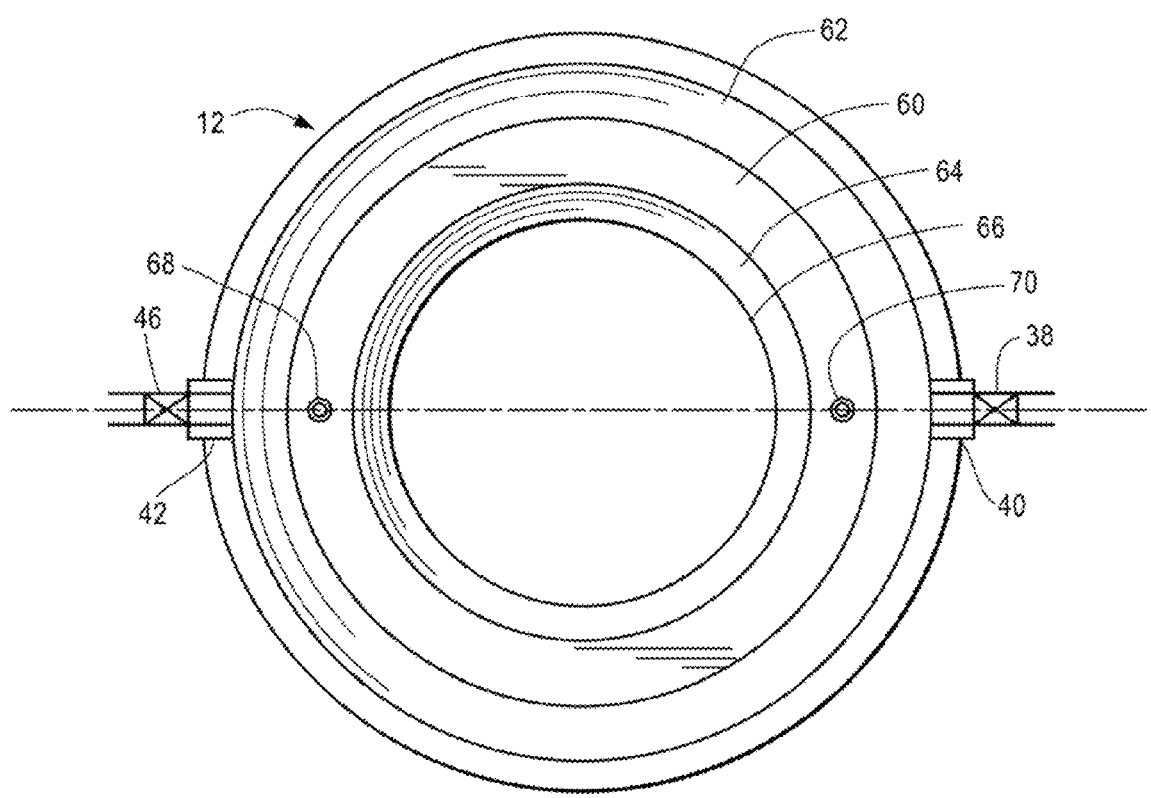
FIG. 3 is a bottom view of the brew basket of FIG. 2.
Figure 4:
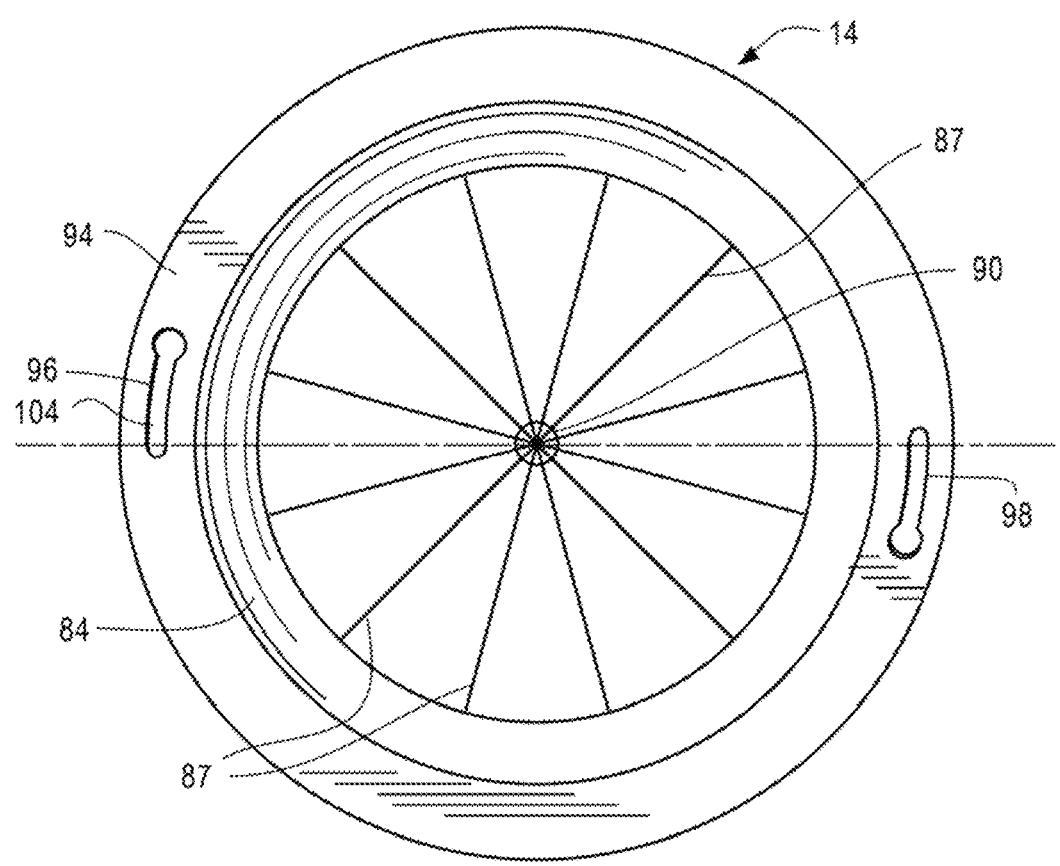
FIG. 4 is a bottom view of the rotatable mixing chamber of FIG. 2.

Referring now to FIGS. 2, 3 and 4, a preferred form of the rotatable mixing chamber 12 and brew basket 14 is described in detail. The body 50 of the chamber 12 has a central axis of symmetry 52 with a generally flat circular, closed top 7 joined to a cylindrical side 56 by an annular curved shoulder 58. The bottom of the cylindrical side 56 is joined to an annular, thin, single-walled, bottom 60 by another annular, curved, bottom shoulder 62. Extending downwardly from the flat annular bottom 60 is a cylindrical neck 63 which is joined at its distal end to a truncated conical wall 64 that terminates in a circular opening 66.

Extending downwardly from the flat annular bottom 60 are two identical, brew basket attachment pins 68 and 70 that are located diametrically opposite one another. Each of the attachment pins 68 and 70 has a relatively thin cylindrical shaft 72 with a distal end that terminates with a flat circular pinhead 74. The pin head 74 has a diameter greater than that of the cylindrical shaft 72.

Preferably, the entire rotatable mixing chamber 12 is made from thin-walled stainless steel, with the top closed top 7, the top shoulder 58, the cylindrical side 56 and the bottom shoulder 62 having a double walled configuration with a gap 76. Preferably, the inner wall and outer wall are evacuated to provide vacuum insulation. Alternatively, the gap 76 is filled with air or a suitable insulating material. In such alternative case, the outer wall may be made from a suitable hard plastic or resin instead of stainless steel.

The brew basket 14 has a conical body with a lower section having a double-walled conical construction and an upper section with a thin, single-walled construction. The lower section has an inner conical wall 80 that serves as an integral filter support, or holder, and an outer conical wall 82 spaced from the inner conical wall by a gap 83. The inner conical wall 80 and the outer conical wall 82 are secured together in spaced relationship by a thin, single walled cylindrical collar 86 at their upper ends and by a cylindrical drain hole collar 88 at their lower ends. The collar 88 surrounds and defines a circular drain hole 90 at the bottom of the impervious, outer wall 82. The upper section of the brew basket 14, above the collar 86 is formed by a water impervious, impermeable, solid, upper conical wall 84 that coincides with and constitutes a continuation of the inner, pervious, conical wall 80. The upper conical wall 84 functions as filter connection wall that mates with the frusto-conical filter connection collar 64 of the mixing chamber 12. The outer conical wall 82 is water pervious and permeable. The outer conical wall is preferably formed by a plurality of uniformly spaced apart, radiating wires 87, as best seen in FIG. 4, but can also be formed by means of an array of holes formed in an otherwise solid wall.

When the mixture of water, beverage and coffee grounds are dumped onto the filter 105 at the end of the seeping period, the grounds and other particulate matter suspended in the water are blocked from passage, but the freshly brewed beverage passes the filter 105, through the water permeable, inner, conical wall 80 and onto the inner surface of the impervious, outer conical wall 82. The beverage then flows down the inside of the outer conical wall 82 and passes out of the drain hole 90. Beverage passing out of the drain hole 90 flows directly into an inlet of the dispenser 17 located closely adjacent to the drain hole to minimize exposure to air and resultant heat loss.

The brew basket 14 is releasably mounted to the bottom 3 of the rotatable mixing chamber 12 in a position underlying the opening 66. The upper filter connection wall 84 of the brew basket 14 is joined to a cylindrical neck 92 from which extends, radially outwardly, an annular mounting collar 94. The mounting collar 94 has a pair of diametrically opposed, identical, mounting slots 96 and 98, as best seen in FIG. 4. As seen in FIG. 2, a pair of diametrically opposed, thin-walled, flat, hand grips or handles 100 and 102 extends downwardly from opposite sides of the outer wall 82 between the top of the inner permeable wall 80 and the bottom of the upper wall 84, to the cylindrical neck 88 surrounding the drain hole 90. These handles 100 and 102 are preferably located respectfully opposite the mating pin mounting slots 96 and 98. They function as handles for raising, lowering, turning and otherwise manipulating the brew basket 14 during mounting and dismounting of the brew basket 14 to the mixing chamber 12 while keeping the user's hands spaced from the drain hole 90 and the outer wall 82 that may become hot immediately after a brew cycle.

During attachment of the brew basket 14 to the bottom of the rotatable mixing chamber 12, the brew basket 14 is held by the wings 100 and 102 and raised toward the bottom of the rotatable mixing chamber. As seen in FIG. 4, the mounting slots 96 and 98 have relatively elongate, arcuate slot bodies 104 that terminate at one end in a relatively, enlarged, generally circular, pin head receiving openings 106. The width of the elongate slot bodies 104 is less than the diameter of the flat circular heads 74 of the mounting pins 68 and 70, but the diameters of the relatively enlarged openings 106 are larger than the circular heads 74. Accordingly, the enlarged openings 106 are aligned with the circular heads 74 and pushed upwardly past the pin heads 74 until the top of the collar 94 is above the pin heads 74 and surrounding the shafts 72. Then the brew basket 14 is twisted, or rotated, to slide the shafts 72 along the relatively narrow slot bodies 104 until the shafts 72 abut the ends of the elongate slot bodies 104 opposite the relatively enlarged opening 106 in a locked position.

Because the diameter of the heads 74 are greater than the widths of the elongate slot bodies 104, the heads lock collar 94 to the flat annular bottom 60 of the rotatable mixing chamber 12. The neck 92 of the brew basket 14 fits snugly around the neck 63 of the rotatable mixing chamber 12. Preferably, the slots are slightly, vertically canted or slanted so that the sliding movement of the mounting pins 68 and 70 along the elongate slot bodies 104 during rotation of the brew basket 14 causes the collar 94 to rise toward the flat annular bottom 60 for a tight resilient engagement with the bottom.

The filter 105, whether a disposable paper filter or a reusable filter, has a conical shape that is congruent with and substantially the same as the conical shape of the inner, pervious, conical wall 80 and the impervious filter connection wall 84. The filter connection wall 84 has conical shape that is congruent with and substantially the same as the shape of the of the annular, truncated, conical, filter connection collar 64 of the rotatable mixing chamber 12. The brew basket 14 is fastened to the rotatable mixing chamber 12 after the filter 105 is fully inserted into and contained within the brew basket 14. The closed end and the body of the filter 105 is inserted into the brew basket 14 and pressed against and supported by the inside of the inner, pervious wall 80, and the upper end 107 of the filter 105 overlaps and is supported by the aligned impervious, upper connection wall 84. Accordingly, when the brew basket 14 is snuggly, releasably attached to the bottom of the rotatable mixing chamber 12, the top part 107 of the filter 105 is squeezed between the upper filter connection wall 84 and the annular, truncated, conical connection collar 64, as best seen in FIG. 5.

The first step in the brewing process is to load the brew basket by inserting a filter 105 into the brew basket 14 and then loading a preselected amount of ground coffee 108 onto the filter 105. This first step is performed prior to the brew basket 14 being mounted to the bottom 3 of the mixing chamber. The second step is to manually releasably attach the brew basket 14 to the bottom 3 of the mixing chamber 12, as shown in FIG. 5. As seen, the brew basket 14 is mounted to the open bottom 3 of the mixing chamber 12 with the filter 105 contained within the brew basket 14. The top part 107 of the filter 105 is squeezed between the connection wall 84 and the connection collar 64, and a layer of coffee grounds 108 is contained within and supported by the body of the filter 105.

Once selections have been made for the quantity of beverage to be made, the brewer 10 is in condition for the beginning of a new brew cycle when a start brew switch is manually actuated. In the third step the start brew switch is actuated. In the fourth step, in response to actuation of the start switch, the controller 16 causes energization of the motor 26 which drives the rotatable mixing chamber 12 to rotate until it is upside down. This causes all of the ground coffee to fall out of the filter 105 and onto the inside surface of the top 7 of the mixing chamber 14. FIG. 6 shows the rotatable mixing chamber 12 and the brew basket 14 after the rotatable mixing chamber has been turned upside down and the dry ground coffee has been dumped onto the interior surface of the closed top 7.

As soon as this has occurred, in the fifth step, the hot water dispense valve 38 is opened for a preselected time period to dispense, or inject, at a high flow rate a preselected amount of hot water 109 from the hot water tank 28 into the rotatable mixing chamber 12. This occurs at the beginning of the water infusion, or water dispense, period of the brew cycle. Preferably, the injection of the hot water is at a sufficiently high flow rate to cause agitation, separation and movement off first the dry ground coffee and then the incomplete mixture of coffee grounds and hot water and resultant extracted beverage.

After the entire amount of the preselected amount of hot water has been infused into the upside down mixing chamber 12, the sixth step of seeping, or allowing the coffee and water mixture to soak. During this time, the motor may be momentarily energized with alternative polarities to shake, or jog, the mixing chamber back and forth by a few degrees to agitate the coffee mixture and thereby speed the mixing and extraction process. In FIG. 7, the rotatable mixing chamber 12 is seen after it has been filled with the entire desired amount of hot water through the hot water valve 38 and the water inlet 40. The addition of the hot water to the ground coffee creates a wet mixture or slurry 110 of hot water mixed with the ground coffee 108 and resultant beverage. The extraction which began with the relatively high speed injection of hot water continues for a preselected amount of seeping time after all the water has been added.

While any lesser amounts of water and coffee grounds may be used, the total amount of hot water 109 injected plus the total amount of ground coffee 108 are always selected to insure that top level 112 of the mixture 110 is always beneath the level 113 of the top of the pervious inner wall 80 and preferably beneath the bottom opening 66 to insure that the water-coffee ground mixture, or beverage, does not flow out though the filter 106 or the drain hole 90. Because the filter 106 is squeezed between the truncated conical connection collar 64 and the upper connection part 84 of the inner conical wall 80, the filter 105 is held in an elevated position and has sufficient structural integrity, the filter 105 does not drop or droop into the mixture 110 when the rotatable mixing chamber 12 and brew basket 14 are turned upside down, as shown in FIG. 7.

Figure 8:
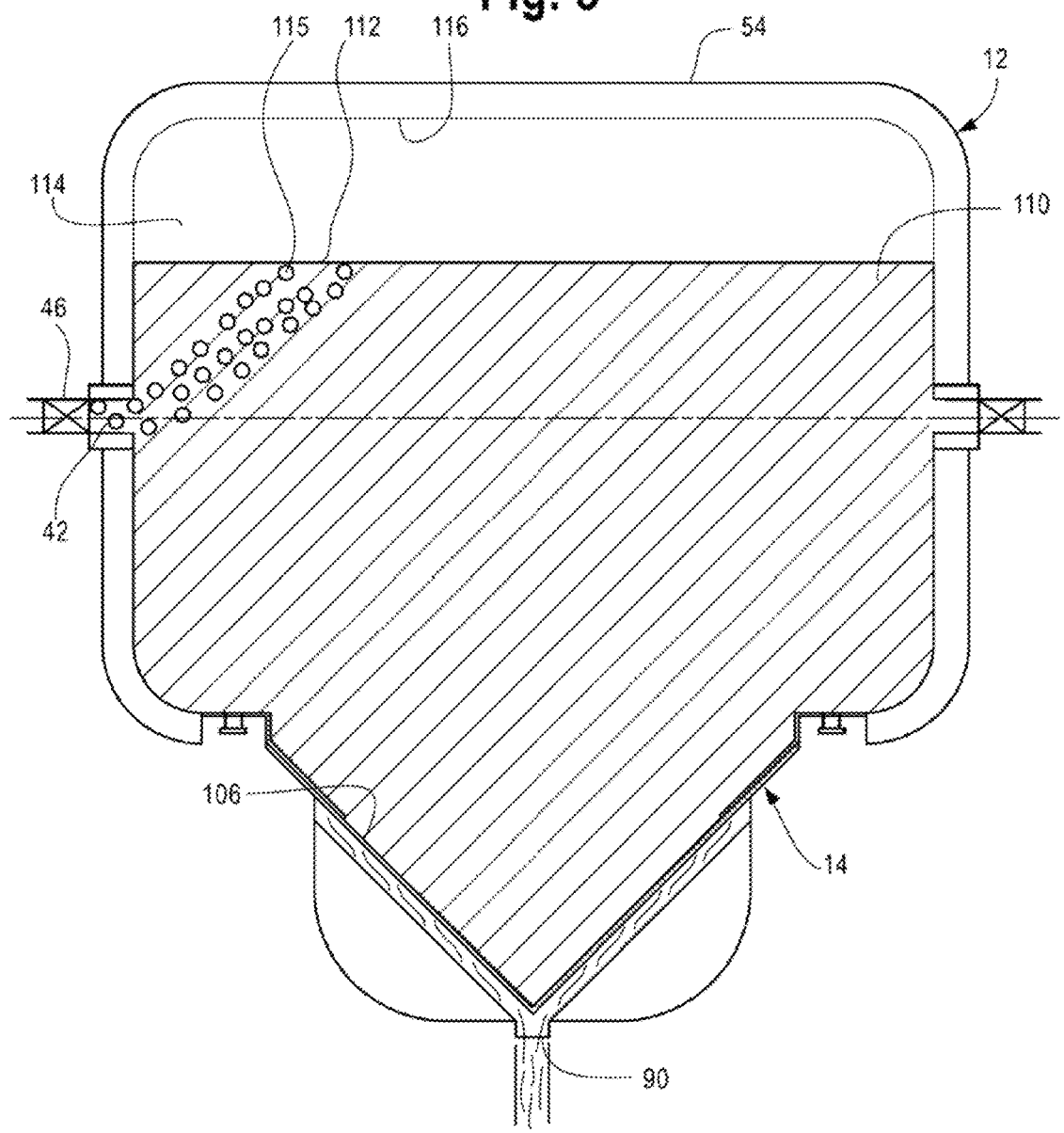
FIG. 8 is a side sectional view of the rotatable mixing chamber at the end of the seeping period and after the desired amount of mixing and uniform extraction has occurred and the rotatable mixing chamber has been rotated back 180-degrees to its original upright position shown in FIG. 2, and pressurized air is being injected into the rotatable mixing chamber at the beginning of the discharge period to rapidly drain the mixture out of the rotatable mixing chamber, through the filter and out of the drain hole at the bottom of the brew basket before over-extraction can occur.

After a preselected seeping time period has passed, depending upon the amount of beverage being made, the type of coffee, the temperature of the water, etc., the seventh step of the brewing process is commenced by starting the discharge period when the rotatable mixing chamber 12 has been returned to the upright position. This discharge period is automatically commenced by the controller 16. FIG. 8 shows the rotatable mixing chamber 12 with the mixture 110 contained within the chamber immediately at the start of the discharge period. At this time the entire quantity of brewed beverage is pressing down upon the filter 105 and rapidly passes through the filter 105, through the water pervious wall 80, down the side of the outer water impervious wall 82 and out of the drain hole 90 and into the dispenser 17.

Preferably, and as soon as the mixing chamber has been turned upright, the eighth step begins when the controller 16 causes the pneumatic valve 46 to automatically open to release pressurized air 115 into the rotatable mixing chamber 12. to speed the discharge of beverage through the filter 105 and out of the drain hole 90. If the level 112 of the water and coffee grounds mixture 110 is above the air inlet 42, as shown, then the air 115 rises through the mixture 110 into the space 114 located above the level 112 and beneath the top 7 above the inner surface 116 of the top 7. This rising of the air through the mixture facilitates agitation and mixing. If the level 112 is beneath the inlet 42, then the pressurized air 115 directly enters the space 114 above the level 112 of the mixture 110.

In either event, the affect of the relatively high pressure air 115 entering into the space 114 is to create air pressure within the space 114 that presses down on the surface 112 of the mixture 110 to hasten the passage of the liquid elements and small particulates of the mixture 110 to pass through the filter 105, down the inside of the outer wall 82, out of the drain hole 90 and into the dispenser 17. The greater the pressure in the space 114, the faster the liquid portion of the mixture, i.e. the freshly brewed coffee, will exit the rotatable mixing chamber 12 and the brew basket 14.

The force of gravity, i.e. the weight of the coffee grounds and water mixture 110 also functions to force the liquid portion of the mixture 110 through the filter 105 and out of the drain hole 90. In a drip-type coffee brewer the hot water is gradually added to the top of the brew basket while beverage simultaneously flows out of the bottom, such that the full amount of water that is added is never all contained in the brew basket at any one time. However, in accordance with the present invention, the force of gravity is maximized because the full quantity of hot water that is to be dispensed is present all at one time before the discharge period. The higher the level 112 of the mixture 110 at the beginning of the discharge period, the greater will be the head pressure and the amount that the discharge rate is enhanced by gravity. When the rotatable mixing chamber is returned to the upright position, the entire amount of water 109 being used to make the particular quantity of beverage has already been added, and thus the force of gravity is more successfully employed for maximum drainage rate at beginning of the discharge or drain period of the brew cycle.

Figure 9:
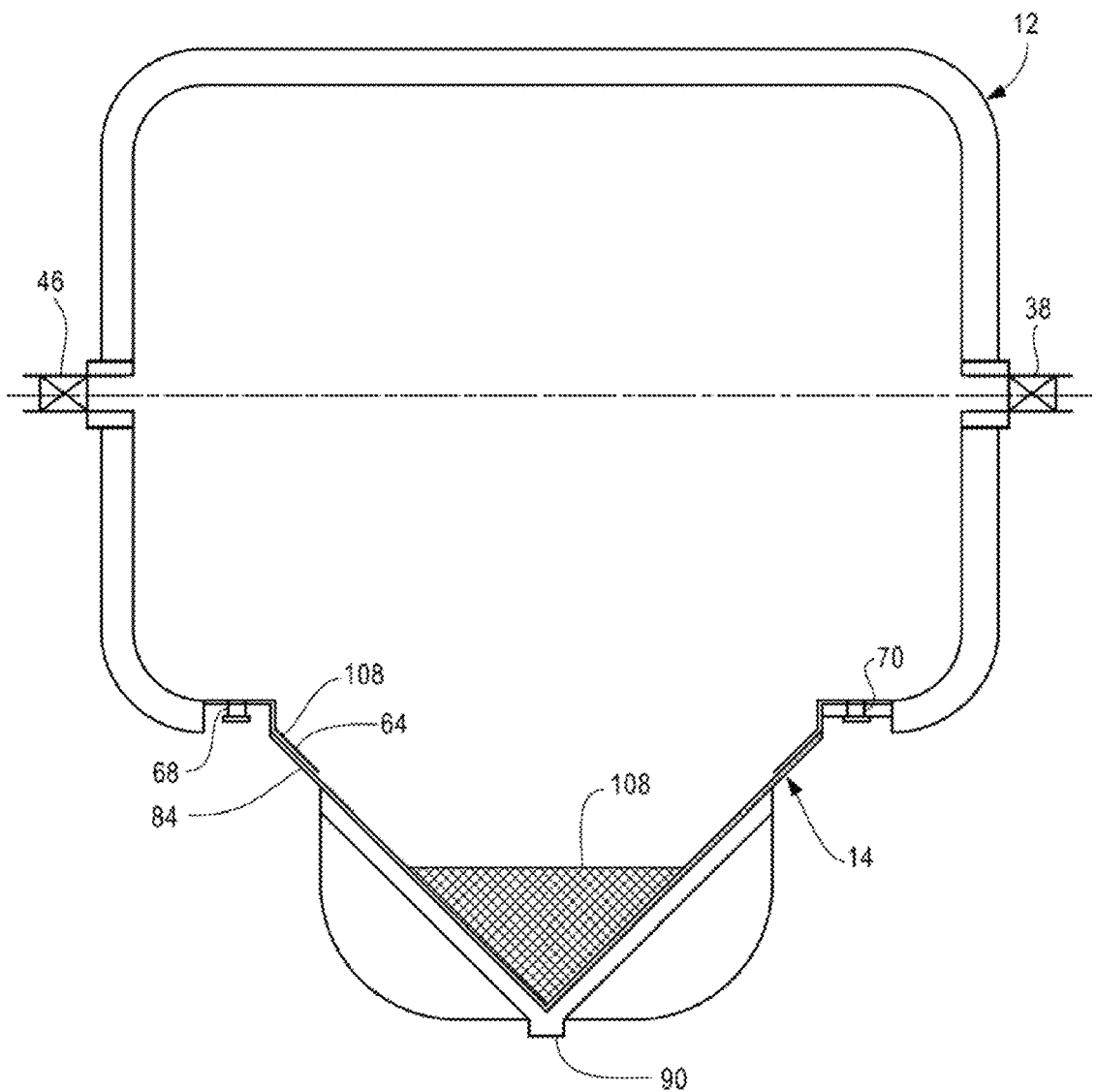
FIG. 9 is a side sectional view of the rotatable mixing chamber and brew basket after the discharge period has ended and all that remains within the brew basket are the wet depleted coffee grounds.

FIG. 9 shows the rotatable mixing chamber 12 and brew basket 14 at or near the end of the discharge period, after substantially all the beverage has been discharged through the drain hole 90. At this time, all that remains in the filter are the depleted, wet coffee grounds. The brew basket 14 may then be removed and the grounds disposed. If the filter 106 is a disposable paper filter, then it also is disposed with the depleted coffee grounds. Otherwise, the filter is removed and cleaned for reuse. The next brew cycle is begun by inserting a clean filter with fresh, dry ground coffee and reattaching the brew basket 14 to the rotatable mixing chamber 12 and repeating the brew cycles steps, as describe above.

Referring now to FIGS. 1 and 10, the controller 16 has a computer with a data memory for temporarily storing optional selections made by the operator, such as batch quantity, coffee type and strength, which are associated with different parameters of water dispense time, seeping time duration and discharge time that have been previously empirically determined and stored in a parameters memory, preferably in a look-up table. Other parameters that may be selectively stored include water temperature, level of air pressure, water level, the selective provision of various status indicators and messages on a suitable electronic display, etc. In addition a software memory contains operational software that draws on the optional selections and associated parameters to control the various operational elements of the brewer 10. Although, not shown in FIG. 1, in addition to the computer, the controller has suitable interface circuits to enable the outputs of the computer to control the various elements of the brewer 10 and to receive inputs from the various sensors. Preferably, the controller operates in accordance with the logic flow chart illustrated in FIG. 10 and described below.

Referring to FIG. 10, after start of the program at step 120, in step 122, it is determined whether the program has been activated to be in the program mode during which the various parameters needed for automatic operation have been entered into storage in the parameters memory. If the program is in the program mode, then the program operates in the program mode in step 124. In step 126, if it is determined that the program mode has been terminated, then the program proceeds to step 128 which begins a serious of steps to determine whether the brewer 10 is ready to begin a new brew cycle.

In step 128, the computer determines, based on inputs from the temperature and level sensing sensors 34 of FIG. 1, whether the water temperature and the water temperature are at the preselected values stored in the parameters memory. Preferably, the water level is kept at a fixed level so that the rate of drainage of the hot water tank 28 when the water dispense valve 30 is opened remains substantially fixed so that the quantity of water dispensed into the rotatable mixing chamber 12 may be determined based on the duration of the dispense period. Alternatively, a flow meter is employed to determine the total quantity of water dispensed into the rotatable mixing chamber 12 and the water level and dispense time may vary. In such case, instead of a hot water tank, an on-demand heating element is used to rapidly heat the metered water to the desired temperature as shown in U.S. patent application Ser. No. 12/248,194 filed Oct. 9, 2008 of Michael W. Lassota et al., entitled "Multi-Beverage Brewer with On-Demand Variable Brew Water Temperature and Method", which is hereby incorporated by reference.

Also, with both a hot water tank and an on-demand heating element, the temperature may be generally fixed in the hot water tank 28 but then instantly increased as desired for different coffee types of coffee or other conditions through use of an inline instantaneous heating element located between the dispense valve 38 and the rotatable mixing chamber 12 or in the line between the hot water tank and the dispense valve 38.

If the temperature and water levels are acceptable, then in step 130 it is determined in response to the sensors 25 and 19 whether the brew basket 14 is locked in place and the dispenser 17 is in place to receive beverage from the brew basket to avoid the safety hazard of starting a brew cycle without the presence of either the brew basket 14 or the dispenser in the proper location. It is assumed that if the brew basket is in place, then the operator has placed the filter 106 and the desired quantity of ground coffee into the brew basket 14. If all is ready, then the program proceeds to step 132.

In step 132, it is determined from the sensor 45 whether the pressure in the air compressor tank 44 is sufficient. If so, the in step 134 a ready to brew indicator light or other indicator is actuated to indicate to the operator that he may commence a new brew cycle. In step 136, if the brew start switch is manually actuated, the program proceeds to step 138 to deactivate the ready to brew indicator and to step 140 to actuate a brew cycle in process indicator. These indications are provided at the control panel 18 where also are located the start brew switch, a display and other standard features of a coffee brewer control panel, such as shown and described in the patents cited above. The program then proceeds to step 142 to actuate the motor 18 to invert the rotatable mixing chamber 14, and after the inversion has been completed, as indicated by the sensor 26. In the next step 144 the water dispense valve 38 is opened to commence the dispense period during which the preselected quantity of hot water is dispensed, or injected, into the rotatable mixing chamber 12.

Once it is determined that the preselected dispense time period has elapsed I step 146, in step 148, the water dispense valve is closed to end the dispense period of the brew cycle. The rotatable mixing chamber may then be agitated in step 150 by jogging the motor 18 or by use of some other mechanical means for shaking the rotatable mixing chamber to speed the mixing of the hot water with the ground coffee. Alternatively, the agitation may commence immediately after the water dispenser valve is opened in step 144.

The mixture of hot water and ground coffee is then allowed to seep, either with or without agitation, for a preselected seeping time period of the brew cycle, and if the seeping has been with agitation, when it is determined in step 152 that the preselected seeping time period has lapsed, the agitation is ended in step 117. As soon as the seep, or seeping, period has ended and any agitation has terminated, in step 156, the motor 26 is again energized to rotate the rotatable mixing chamber 180-degrees to return the rotatable mixing chamber 12 to the upright position with the filter and brew basket 14 beneath the rotatable mixing chamber. As soon as this occurs, in step 158, the pneumatic valve 46 is opened to inject pressurized air into the rotatable mixing chamber 12. If this lowers the pressure in the air compressor tank 44 beneath a preselected level as indicated by the sensor 45, then in step 160, the electric air pump 48 is actuated to repressurize the air compressor tank 44.

In step 162, once it is determined that a preselected discharge time period of the brew cycle has lapsed and all the beverage has been discharged out of the drain hole 90 of the brew basket 14 and into the dispenser 17, the pneumatic valve 46 is closed, in step 164. Alternatively, a sensor is employed to detect when no more beverage is coming out of the drain hole 90, and the valve 46 is closed when this occurs with closure occurring regardless of detection after some preselected maximum discharge time period.

After the pneumatic valve 164 is closed, in step 166 a brew in process indicator is deactuated and the program moves to step 168. In step 168, a determination is made in response to the sensor 25 as to whether the brew basket has been removed in order to remove the filter paper or other filter and the depleted wet coffee ground so that the brew basket may be reloaded with a new filter and fresh dry ground coffee. If the brew basket is not removed, a remove brew basket indicator is actuated in step 170, and if the brew basket is removed, the remove brew basket indication is terminated and an install brew basket indicator is actuated, in step 172. The program then returns to start 120.

While a particular embodiment has been disclosed in detail, it should be appreciated that many obvious changes may be made without departing from the basic concept of the invention of using air pressure to rapidly discharge a mixture of coffee grounds from a rotatable mixing chamber before the coffee grounds can be over extracted and to avoid under extraction to obtain uniform abstraction in an automated brewer capable of making large batches of freshly brewed coffee of a few or more gallons or as small an amount as a single serving of only several ounces. While the portable mixing chamber is mounted for rotation about axles aligned with the axis of rotation, it should be appreciated that the rotatable mixing chamber could be held by other means for rotation about the rotary axis. While the inner wall of the brew basket is formed of plurality of uniformly spaced apart wires, it could also be formed of a wall that is perforated with a plurality of holes. While the inner, water pervious wall of the filter basket eliminates the need for a separate pervious filter holder, it should be appreciated that a separate pervious filter holder that is releasably connected but removable from the filter basket could be used in lieu of the integral, water pervious inner wall. Also, while it is preferred that all of the brewing steps after actuation of the start brew switch are performed automatically, the invention could still be successfully employed by manually rotating the mixing chamber at the appropriate times and the jogging of the mixing chamber could also be performed manually, by providing a hand crank in lieu of the motor driven drive gear. Reference should therefore be made to the appended claims for the full scope of the invention.

The invention claimed is:

1. A method of brewing a beverage in an electrical automatic beverage brewer, comprising the steps of:
    providing a rotatable mixing chamber assembly having a rotatable mounted mixing chamber with a closed top and an open bottom located beneath the closed top when in an upright position,
    installing a filter into a brew basket with an open top and a bottom with a drain hole;
    inserting a preselected amount of a beverage ingredient into the brew basket and supported on the filter;
    mounting the brew basket to the mixing chamber with the open top of the brew basket pressed against the open bottom of the mixing chamber;
    automatically rotating the mixing chamber to an upside down position with the closed top of the mixing chamber beneath the open bottom of the mixing chamber and the brew basket to dump the ingredient out of the filter and the brew basket onto the closed top of the mixing chamber;
    automatically injecting a preselected quantity of water into the mixing chamber sufficient to make at least a plurality of individual servings of beverage made of a mixture of the water and the ingredient;
    after lapse of a preselected seeping time period, automatically rotating the mixing chamber back to an upright position with the closed top above the open bottom to pour the mixture onto the filter; and
    passing the beverage through the filter and out of the drain hole into a beverage dispenser capable of holding at least several individual servings of beverage.

2. The brewing method of claim 1 in which the step of injecting water into the mixing chamber includes the step of injecting water into the mixing chamber to a level beneath the open bottom of the mixing chamber while the mixing chamber is in the upside down position.

3. The beverage brewing method of claim 1 in which the steps of rotating the mixing chamber to an upside down position, injecting water into the mixing chamber, rotating the mixing chamber to an upright position and injecting pressurized air into the mixing chamber are all performed automatically according to a preselected timing sequence in response to operation of a controller.

4. The beverage brewing method of claim 1 including the step of injecting pressurized gas into the mixing chamber after the step of rotating the mixing chamber to an upright position to hasten the passage of beverage through the filter and out of the drain hole.

5. The beverage brewing method of claim 4 in which the step of injecting pressurized gas into the mixing chamber includes the steps of
    pressurizing a gas compressor tank to a preselected pressure by operating an electric air pump, and
    actuating a solenoid controlled gas valve connected between the gas compressor tank and the mixing chamber for a preselected amount of time.

6. The beverage brewing method of claim 1 including the step of pressing the filter between a filter connection surface adjacent the open bottom of the mixing chamber and a filter connector surface adjacent the open top of the filter basket when the filter basket is releasably mounted to the mixing chamber.

7. The beverage brewing method of claim 1 in which
    the step of inserting beverage ingredient into the basket is performed when the brew basket is detached and spaced from the mixing chamber, and
    the step of mounting the brew basket includes the step of releasably attaching the brew basket to the mixing chamber with releasable mating connectors carried by the mixing chamber and the brew basket.

8. A method of brewing beverage in an electrical automatic beverage brewer, comprising the steps of:
    mixing water with a dry beverage ingredient inside a rotary mixing chamber mounted for automatic rotation from an upside down position to an upright position after the chamber has been in the upside down position for a preselected seeping time period automatically determined by an electronic controller;
    after lapse of the preselected seeping time period, automatically rotating the mixing chamber back to the upright position;
    after the mixing chamber has been automatically rotated to the upright position, automatically positively pressurizing the mixing chamber to force beverage formed from the mixture downwardly out of the mixing chamber, and through a filter and into a beverage container.

9. The beverage brewing method of claim 8 in which the step of pressurizing includes the step of passing pressurized air from a source without the mixing chamber through the mixture and into a volume within the mixing chamber located above the mixture.

10. The beverage brewing method of claim 8 in which the step of pressurizing includes the step of automatically actuating an air pump in response to an electronic controller.

11. The beverage brewing method of claim 8 in which the step of pressurizing includes the step of automatically opening an electronically controllable valve to connect a source of pressurized air to the interior of the mixing chamber.

12. The beverage brewing method of claim 8 in which the mixing chamber has a closed top and an open bottom,
and the step of mixing includes the step of
automatically injecting a preselected quantity of water into the mixing chamber in an amount in excess of at least a plurality of individual servings of beverage to a level that is beneath the open bottom of the mixing chamber when the closed top of the mixing chamber is beneath the open bottom.

13. The beverage brewing method of claim 8 in which
the mixing chamber has a permanently closed top and an open bottom, and including the steps of
inserting a preselected amount of beverage ingredient into a brew basket, and
after the step of inserting and before the step of mixing, releasably mounting the brew basket to the open bottom, and
rotating the mixing chamber to the upside down position after the brew basket has been releasably mounted to the open bottom and the beverage ingredient has been inserted.

14. The beverage brewing method of claim 13 including the steps of
installing a filter into the brew basket,
automatically releasably securing an upper open end of the filter to the brew basket when the brew basket is releasably mounted to the open bottom of the mixing chamber, and
automatically releasing the filter from attachment to the filter basket when the brew basket is detached from the open bottom of the mixing chamber.

15. The beverage brewing method of claim 14 in which
the brew basket has a double walled construction with an inner water pervious wall and an outer water impervious wall, and the step of installing the filter includes the step of
supporting the filter on the inner water pervious wall of the brew basket when the beverage is forced through the filter.

16. The beverage brewing method of claim 15 including the step of passing the beverage through the inner water pervious wall after being forced through the filter.

17. The beverage brewing method of claim 16 including the step of passing the beverage downwardly along the outer wall to a drain hole formed in the outer wall after the beverage is forced through the filter and before being passed into the container.

18. The beverage brewing method of claim 8 in which the step of mixing includes the step of injecting water into the mixing chamber when the mixing chamber is in the upside down position.

19. A method of automatically brewing a beverage with an electrical, automatic, beverage brewer, comprising the steps of:
mounting a brew basket with dry beverage ingredient supported within a filter and a drain hole to an open bottom of a rotatable mixing chamber for fluid communication with the mixing chamber through the open bottom of the mixing chamber;
automatically turning the rotatable mixing chamber with the brew basket upside down to dump the dry beverage ingredient out of the filter and onto a closed top of the rotatable mixing chamber;
automatically infusing a preselected quantity of water into the rotatable mixing chamber to a level beneath the open bottom of the mixing chamber and onto the thy beverage ingredient after the mixing chamber has been turned upside down;
mixing the preselected quantity of water with the dry beverage ingredient within the mixing chamber for a preselected seeping period of time; and
automatically turning the mixing chamber and mounted brew basket right side up after lapse of the preselected seeping time period; and
automatically pressuring the beverage through the filter and out of the drain hole of the brew basket at least partly with the force of gravity while filtering out dissolved elements of the beverage ingredient.

20. The brewing method of claim 19 including the step of automatically injecting pressurized air into the mixing chamber after the mixing chamber has been turned right side up to assist the force of gravity pressuring the beverage through the filter.

21. The brewing method of 21
in which the step of automatically injecting pressurized air includes the steps of
pressurizing an air compressor tank with an air pump, and
selectively passing pressurized air from the air compressor tank to the mixing chamber through an electronically controlled pneumatic valve.

22. The brewing method of claim 20 in which the step of pressurizing includes the step of injecting pressurized air into the mixing chamber for a preselected amount of time.

23. The brewing method of claim 22 in which the step of pressurizing includes the step of pressurizing the mixing chamber for a preselected amount of time that is greater for greater amounts of beverage being brewed than another preselected amount of time when lesser amounts of beverage are being brewed.

24. The brewing method of claim 20 in which the step of injecting pressurized air includes the step of injecting the pressurized air into the beverage in the beverage to agitate the beverage to hasten mixing during the preselected seeping time period.

25. The brewing method of claim 19 in which the
brew basket includes a water pervious filter holder within the brew basket, and including the step of
passing the beverage through the filter holder.

26. The brewing method of claim 23 in which the filter holder is a nonremovable permanent part of the brew basket.

27. The brewing method of claim 19 in which
the brew basket has an outer solid wall with an open top and a bottom at which the drain hole is located, and including the step of
supporting a filter on a water pervious inner wall of the filter holder permanently joined to the outer, solid, water impervious wall in spaced relationship.

28. The brewing method of claim 19 in which
the brew basket includes a filter connection wall that is a water impervious extension of the inner wall and surrounds an open top of the brew basket, and
the rotatable mixing chamber has a downwardly extending filter connector wall for mating connection with the filter connection wall with an edge of a filter held between the filter connection wall and the filter connector wall, and including the step of resiliently, releasably mounting the brew basket filter to the mixing chamber with the connection wall resiliently pressing against the filter connector wall with a filter being resiliently squeezed between the filter connection wall and the filter connector wall.

29. The brewing method of claim 28 in which the step of resiliently, releasably mounting the brew basket mounting includes the step of mating at least a pair of mounting pins carried by one of the brew basket and the rotatable mixing chamber with at least a pair of mounting slots within which the pins are received carried by another one of the brew basket and the rotatable mixing chamber.

30. The brewing method of claim 19 in which the step of mixing includes the step of mixing a plurality of individual servings of beverage beneath the open bottom when the mixing chamber is turned upside down.

31. The brewing method of claim 19 including the step of insulating the mixing chamber with a double-walled construction having an evacuated insulating gap.

32. The brewing method of claim 19 in which the step of infusing includes the step selectively infusing water from a source of water into the mixing chamber through a water input connector and a solenoid controlled valve.

33. The brewing method of claim 32 in which the mixing chamber has a pair of opposite sides and the pneumatic input connector and the water input connector are located on opposite ones of the pair of opposite sides and aligned with a axis of rotation of the rotary mixing chamber.

34. The brewing method of claim 33 in which the steps of automatically turning includes the step of mounting the mixing chamber for rotation on a pair of aligned axle stubs located on opposite sides of the mixing chamber.

35. The brewing method of claim 34 in which the steps of turning the mixing chamber includes the steps of selectively controlling applying electrical power to an electromechanical rotary drive apparatus mechanically linking the electromechanical drive apparatus to one of the axle stubs.

36. The brewing method of claim 35 in which the electromechanical drive apparatus is a reversible electrical motor, or, and the step of turning includes automatically selectively controlling electrical power to the reversible electrical motor with one polarity when driving the mixing chamber to turn upside down, and automatically selectively applying power to the reversible electrical motor with another polarity opposite to the one polarity then turning the mixing chamber right side up.

* * * * *